US007779086B1

(12) United States Patent
Gammo et al.

(10) Patent No.: US 7,779,086 B1
(45) Date of Patent: Aug. 17, 2010

(54) METHODS AND APPARATUS FOR PERFORMING A REMOTE PROCEDURE CALL

(75) Inventors: Louay Gammo, Toronto (CA); Éamonn Patrick McManus, Grenoble (FR); Frederic Herrmann, Grenoble (FR); Anupama Gujran, Cupertino, CA (US); Frederic Salles, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 1630 days.

(21) Appl. No.: 10/839,114

(22) Filed: May 4, 2004
(Under 37 CFR 1.47)

(51) Int. Cl.
G06F 15/16 (2006.01)
(52) U.S. Cl. .................. 709/219; 709/201; 709/203; 709/217; 709/218
(58) Field of Classification Search ......... 709/201–203, 709/217–219
See application file for complete search history.

(56) References Cited

U.S. PATENT DOCUMENTS

| 5,951,694 | A * | 9/1999 | Choquier et al. ............ 714/15 |
| 6,067,580 | A * | 5/2000 | Aman et al. ................ 719/330 |
| 6,088,659 | A * | 7/2000 | Kelley et al. ............... 702/62 |
| 6,185,695 | B1 * | 2/2001 | Murphy et al. .............. 714/4 |
| 6,336,147 | B1 * | 1/2002 | Brownell et al. ............ 719/310 |
| 6,378,004 | B1 * | 4/2002 | Galloway et al. ........... 719/321 |
| 6,446,137 | B1 * | 9/2002 | Vasudevan et al. ......... 719/330 |
| 6,856,993 | B1 * | 2/2005 | Verma et al. ................ 707/101 |
| 2005/0091357 | A1 * | 4/2005 | Krantz et al. ............... 709/223 |

OTHER PUBLICATIONS

"Java Remote Method Invocation (Java RMI)," http://java.sun.com/products/jdk/rmi/ downloaded from the Internet on Oct. 5, 2004.
"RPC Protocol Overview," http://www.freesoft.org/CIE/Topics/86.htm downloaded from the Internet on Feb. 6, 2004.
R. Srinivasan, "RPC: Remote Procedure Call Protocol Specification Version 2," RFC 1831, Aug. 1995.
R. Srinivasan, "XDR: External Data Representation Standard," RFC 1832, Aug. 1995.
R. Srinivasan, "Binding Protocols for ONC RPC Version 2," RFC 1833, Aug. 1995.
"Naming Service Specification," OMG Revised Edition: Feb. 2001.

* cited by examiner

*Primary Examiner*—Rupal D Dharia
*Assistant Examiner*—Hua Fan
(74) *Attorney, Agent, or Firm*—Brooks Kushman P.C.

(57) ABSTRACT

Methods and apparatus for performing automatic service selection in a client are disclosed, where the client supports a protocol for calling a subroutine on a remote server. A request is sent to a name server for connection information for a specified service. A first handle for the specified service is then obtained using connection information received from the name server, the first handle including the connection information for the specified service, thereby enabling the specified service to be called via the first handle. A notice indicating that the first handle is not functional is then received. A subsequent request is automatically sent to the name server for connection information for the specified service when the notice is received. A second handle including updated connection information for the specified service is then obtained, thereby enabling the specified service to be called via the second handle.

15 Claims, 8 Drawing Sheets

| Name of service | Version(s) | Accepted RPC # | Port # | Address of machine providing the service |
|---|---|---|---|---|
| | | | | |
| | | | | |
| | | | | |
| | | | | |
| | | | | |

FIG. 5

METHODS AND APPARATUS FOR PERFORMING A REMOTE PROCEDURE CALL

BACKGROUND

A server is typically contacted by a client when data is requested from the server. Thus, the server's primary responsibility is to respond to each server request with the requested data. Various protocols are available to enable a client to submit a request to a server.

As one example, the Remote Procedure Call (RPC) protocol is generally used to transmit a request from a client to a server, which is typically referred to as a "remote procedure call." Generally, the client includes a RPC stub that serves as an interface to the server. Specifically, the stub packages the parameters that are sent to the appropriate server when the client calls that particular service. In this manner, a RPC is used by a client to invoke a service provided by a server.

Generally, each server has its own broker, which is called to initiate a client-server relationship. Specifically, a RPCBIND function is called to invoke a RPC relationship. The server provides the broker the name of the services provided by the server. In addition, the client will inform the broker that it is attempting to locate a requested service.

When the client sends a RPCBIND request to the broker, the broker performs a lookup for the requested service, and provides a "handle" to the service to the client. The client may thereafter call the service by using the handle name and the service name. For example, the handle H1 may be provided to the client for the service "get-time," enabling the client to call the service via a call such as H1.get-time.

When the server crashes or becomes non-functional, the handle is no longer valid for the purposes of invoking the server's services. Upon receiving an error message when the service is called, the client then performs a second lookup for the requested service. In response to this second lookup, a second handle is provided to the client in the event that another second server provides the same service. The client may then access this second server via this second handle.

Traditionally, RPC is machine-based. Specifically, each server runs RPC and includes its own broker. In order to obtain the port number of the machine to initiate a particular service, it must contact the broker. Since brokers are separately implemented on each server, the client must know ahead of time which machine is providing the service in order to contact the correct broker.

When a server becomes non-functional, the client must actively locate another server that provides the same service as the initial server. In accordance with various embodiments of the invention, a redundant server is located transparently to the client and a binding is performed automatically.

Typically, RPC bind is implemented on each server. As described above, typically, each server implements it's own broker. Specifically, each server implements its own broker and runs RPC to enable the server to register its services with the broker using RPCBIND. Thus, in order to call the services provided by a particular server, a client typically needs to call the broker on the appropriate server in order to obtain the information needed (e.g., port number) in order to establish a connection with the server. This is particularly important for protocols such as TCP/IP and UDP/IP, which require a port number in order to establish a connection.

Typically, if a server crashes or becomes non-functional, a client calling a service provided by that server will receive an error when that service is called. A server may become non-functional in a variety of circumstances. For instance, a "failover" occurs when a particular server fails and a service is then made available on a different server. As another example, a particular service may simply be moved to another server, resulting in a "switchover." In either case, the client must then locate another server that provides the same service.

SUMMARY

The present invention enables automatic service selection to be performed at a client. This is accomplished, in part, via a name server that stores connection information for multiple services supported by one or more servers. In this manner, a client may contact the name server for connection information in order to call a service supported by one of the servers.

In accordance with one aspect of the invention, automatic service selection in a client is performed, where the client supports a protocol for calling a subroutine on a remote server. For instance, the protocol may be the RPC or another suitable protocol. A request is sent to a name server for connection information for a specified service. A first handle for the specified service is then obtained using connection information received from the name server, the first handle including the connection information for the specified service, thereby enabling the specified service to be called via the first handle. A notice indicating that the first handle is not functional is then received. A subsequent request is automatically sent to the name server for connection information for the specified service when the notice is received. A second handle including updated connection information for the specified service is then obtained, thereby enabling the specified service to be called via the second handle.

In accordance with one embodiment, the client functions are performed transparently to the client. In other words, the client functions are performed automatically in order to obtain connection information for the appropriate server. This connection information may include, for example, an IP address and port number. Automated functions may be performed, for instance, via a library coupled to a standard library such as a standard Remote Procedure Call (RPC) library.

In accordance with another aspect of the invention, automatic service selection is performed in a name server, wherein connection information associated with the selected service is provided for calling the service (e.g., subroutine or group of subroutines) on a remote server. A request for connection information for a specified service is received at the name server from a client. The connection information for the specified service is then provided to the client, wherein the connection information includes an IP address and a port number to be used to call the specified service. A subsequent request is then received at the name server for connection information for the specified service from the client. Updated connection information for the specified service is then provided to the client when the connection information is no longer valid, wherein the updated connection information includes an updated IP address and an updated port number to be used to call the specified service.

Embodiments of the invention may be implemented software, hardware, or a combination of hardware and software. Embodiments of the invention can also be embodied as computer readable code on a computer readable medium. In addition, embodiments of the invention may also include data structures.

BRIEF DESCRIPTION OF THE DRAWINGS

Embodiments of the invention may best be understood by reference to the following description taken in conjunction with the accompanying drawings in which:

FIG. 5 is a diagram illustrating a directory stored on a cluster name server such as that illustrated in FIG. 3 and implemented in FIG. 4 in accordance with one embodiment of the invention.

DETAILED DESCRIPTION

Figure 1:
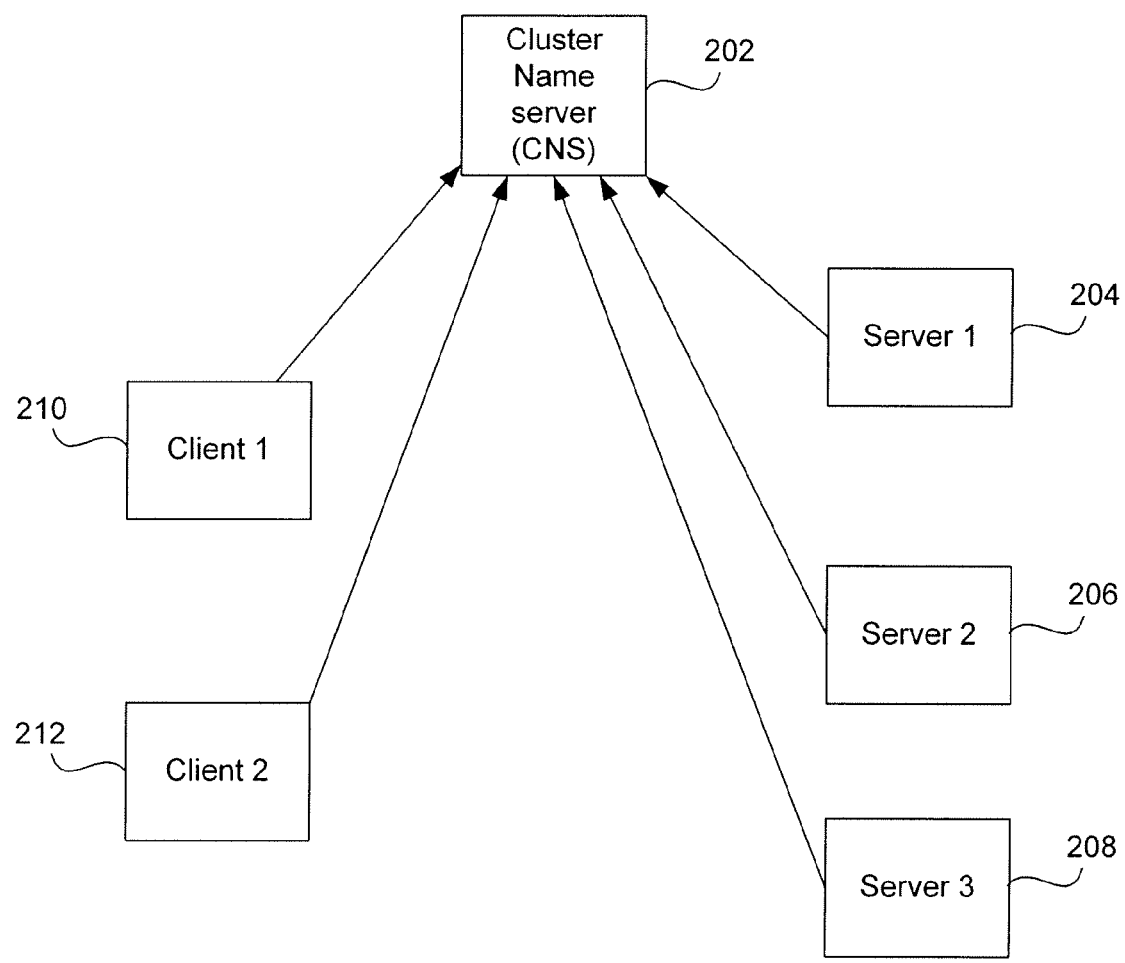
FIG. 1 is a block diagram illustrating a system in which a separate name server is used to support multiple servers.

In the following description for embodiments of the invention, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Under various circumstances, a server may cease to be functional for a particular service. This may be a result of a software or hardware malfunction. Alternatively, the software or hardware may be modified, updated or otherwise reconfigured. In the event that the server is updated, the server will generally be powered down to perform these upgrades. Another server will therefore generally serve to "replace" the first server, either temporarily or permanently.

Many systems support redundancy to ensure that a service will be available to a client. Specifically, multiple servers are often configured to support the same service. In the event of a malfunction or modification of one server, the client will be transparently redirected to another server providing that same service.

In the following description, the term "service" will be used to refer to any software service. A service may be implemented via one or more subroutines or programs. For instance, each subroutine may be implemented in the form of a function or procedure.

The present invention enables a service to be provided to a client by a separate server (i.e., remote server). Specifically, a plurality of servers are configured to provide the same service. The plurality of servers may be referred to as a "cluster" of servers. Generally, one of the plurality of servers is configured to operate as a primary server. Upon failure, reconfigure or power down of the primary server, a secondary redundant server will operate to replace the primary server.

Various protocols are available to enable a client to perform a subroutine call on a remote server. In the following description, embodiments of the invention are described with reference to the Remote Procedure Call (RPC) protocol. However, it is important to note that the described embodiments may also be implemented with another protocol, such as Common Object Request Broker Architecture (CORBA) or Distributed Component Object Model (DCOM).

RPC can be implemented on top of a variety of protocols, including TCP/IP, UDP/IP, and doors. Both TCP and UDP rely on well-known port numbers to perform service rendezvous. The correct port number is generally obtained through a special RPC service such as PORTMAP or RPCBIND. RFC 1831, "RPC: Remote Procedure Call Protocol Specification Version 2," by R. Srinivasan, August 1995, RFC 1832, "XDR: External Data Representation Standard," by R. Srinivasan, August, 1995, and RFC 1833, "Binding Protocols for ONC RPC Version 2," by R. Srinivasan, August 1995, are incorporated herein for all purposes. Typically, RPC services register themselves using a call to RPCBIND. The appropriate port number may thereafter be ascertained by the client in order to call that service via the appropriate port.

FIG. 1 is a block diagram illustrating a system in which a separate name server is used to support multiple servers. In accordance with various embodiments of the invention, a Cluster Name Server (CNS) 202 functions as a broker for a plurality of servers, server 1 204, server 2 206, and server 3 208. Specifically, the CNS 202 runs RPC, enabling each of the servers 204, 206, 208 to register its services with the CNS 202. One or more clients 210, 212 may thereafter access these services. Specifically, a client 210 or 212 may contact the CNS 202 to obtain information enabling the client 210 or 212 to call a particular service. The information provided by the CNS 202 to the client 210 or 212 will identify the server (e.g., IP address) and port number, thereby enabling the client 210 or 212 to call the requested service.

As described above, two or more servers will typically be configured to provide the same service(s). In the event of a shutdown, failure, or reconfigure of one of the servers, another server may act in its place to provide the same service(s). This is accomplished, in accordance with one embodiment, through the implementation of a cluster that groups a cluster of servers together.

Figure 2:
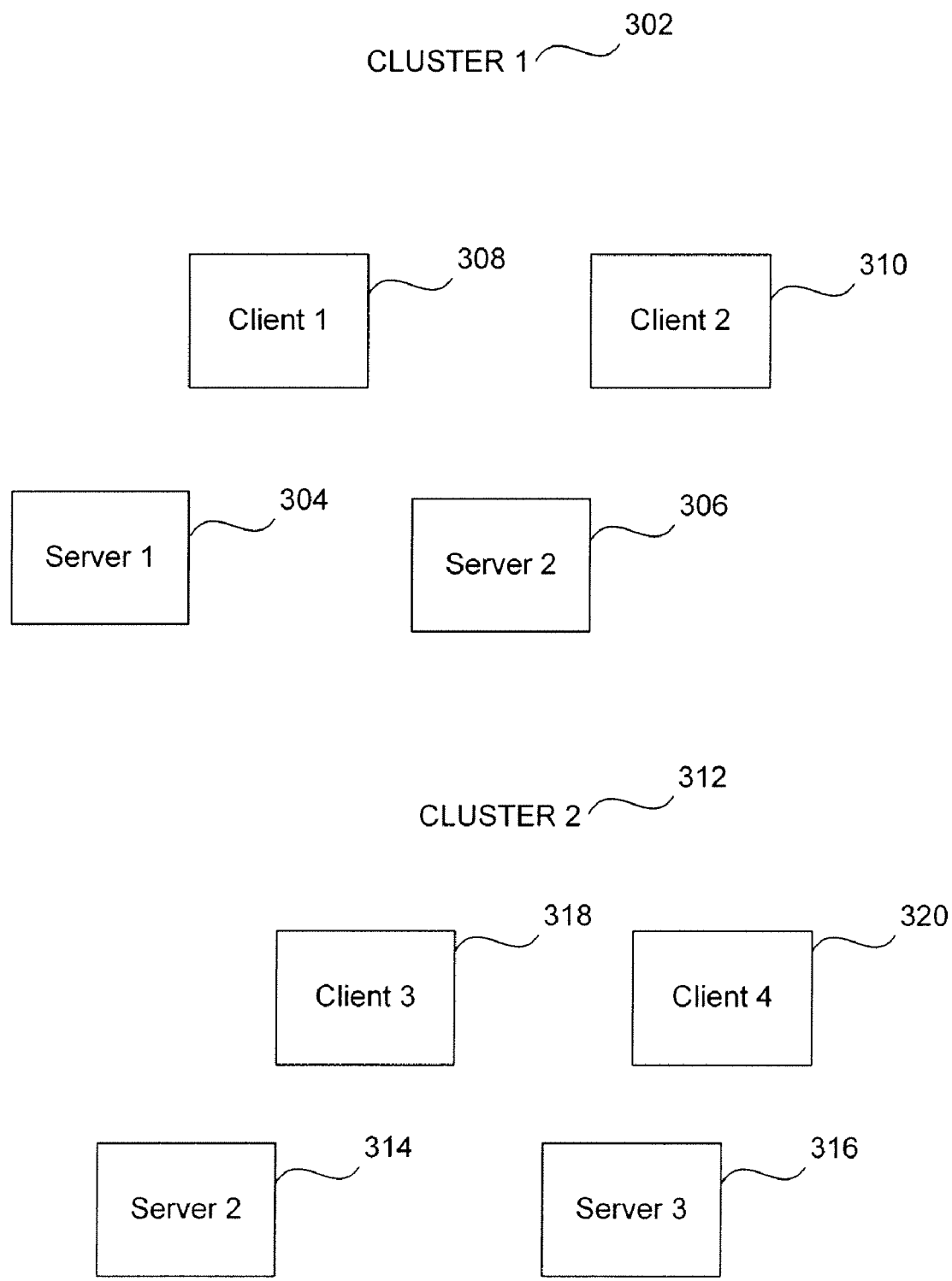
FIG. 2 is a block diagram illustrating node clusters configured in accordance with one embodiment of the invention.

FIG. 2 is a block diagram illustrating node clusters configured in accordance with one embodiment of the invention. As shown, a plurality of nodes are grouped together in the form of a cluster. The nodes may include one or more servers, as shown. In addition, a cluster may include one or more clients. For instance, it may be desirable for a variety of reasons (e.g., location, access rights) to associate a client with a particular server or set of servers.

One or more clusters may be formed in order to associate a plurality of nodes with one another. In this example, two different clusters are formed. Cluster 1 302 includes servers 304 and 306, and clients 308 and 310. Cluster 2 312 includes servers 314 and 316, and clients 318 and 320.

Figure 3:
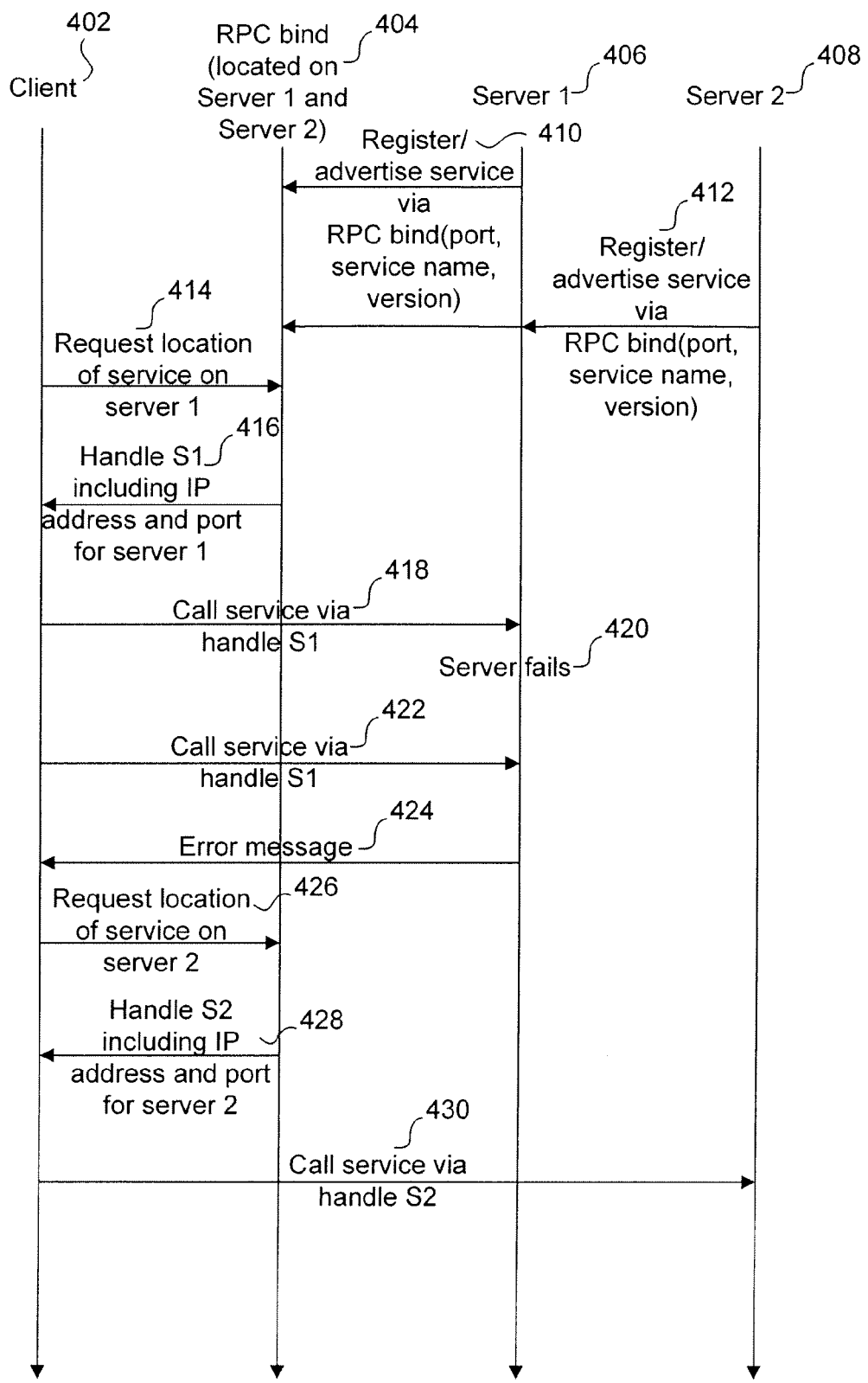
FIG. 3 is a transaction flow diagram illustrating a method of calling a subroutine on a remote server.

FIG. 3 is a transaction flow diagram illustrating a method of calling a subroutine on a remote server. Processes performed by the client, RPC bind function, server 1, and server 2 are represented by vertical lines 402, 404, 406, and 408, respectively. Typically, the RPC bind function 404 is located on each server (e.g., server 1 406 and server 2 408), rather than on a separate server. In order to provide the information enabling a connection to be established with a service, the server registers with its broker located on the server. Specifically, server 1 registers (e.g., advertises) the service(s) it provides with its broker via a RPCBIND function call at 410 with the port number, service name, and version as parameters. Similarly, server 2 registers (e.g., advertises) the service(s) it provides with its broker via a RPCBIND function call at 412 with the port number, service name, and version as parameters. It is important to note that since each server maintains its own broker, it need not provide the broker with the server's address.

In order to ascertain the location (e.g., port) of a service on server 1, the client 402 sends a request to the broker implementing RPCBIND on server 1 at 414. In response, the broker on server 1 provides a handle S1 with the IP address and port number for server 1 at 416. The client 402 may then call the service on server 1 406 by using the handle S1 at 418.

When the server fails 420 or becomes non-functional for the requested service, the client 402 will be unaware of this failure. As a result, the client 402 will continue to call the service on server 1 406 via the handle S1 as shown at 422. The client 402 will then receive an error message at 424.

Upon learning that the server 1 406 is no longer functional for the requested service, the client will then request the location of the service on server 2 408 by calling the broker on server 2 at 426. The broker on server 2 will then provide a second handle S2 to the client 402 with the IP address and port number for server 2 at 428. The client may thereafter call the service on service 2 408 by using the handle S2 at 430.

As described above, upon receiving an error message, the client must actively establish a connection with another server. Specifically, the user must identify another server that provides the same service and establish a connection with that server. Unfortunately, this is a time-consuming and burdensome process.

Figure 4:
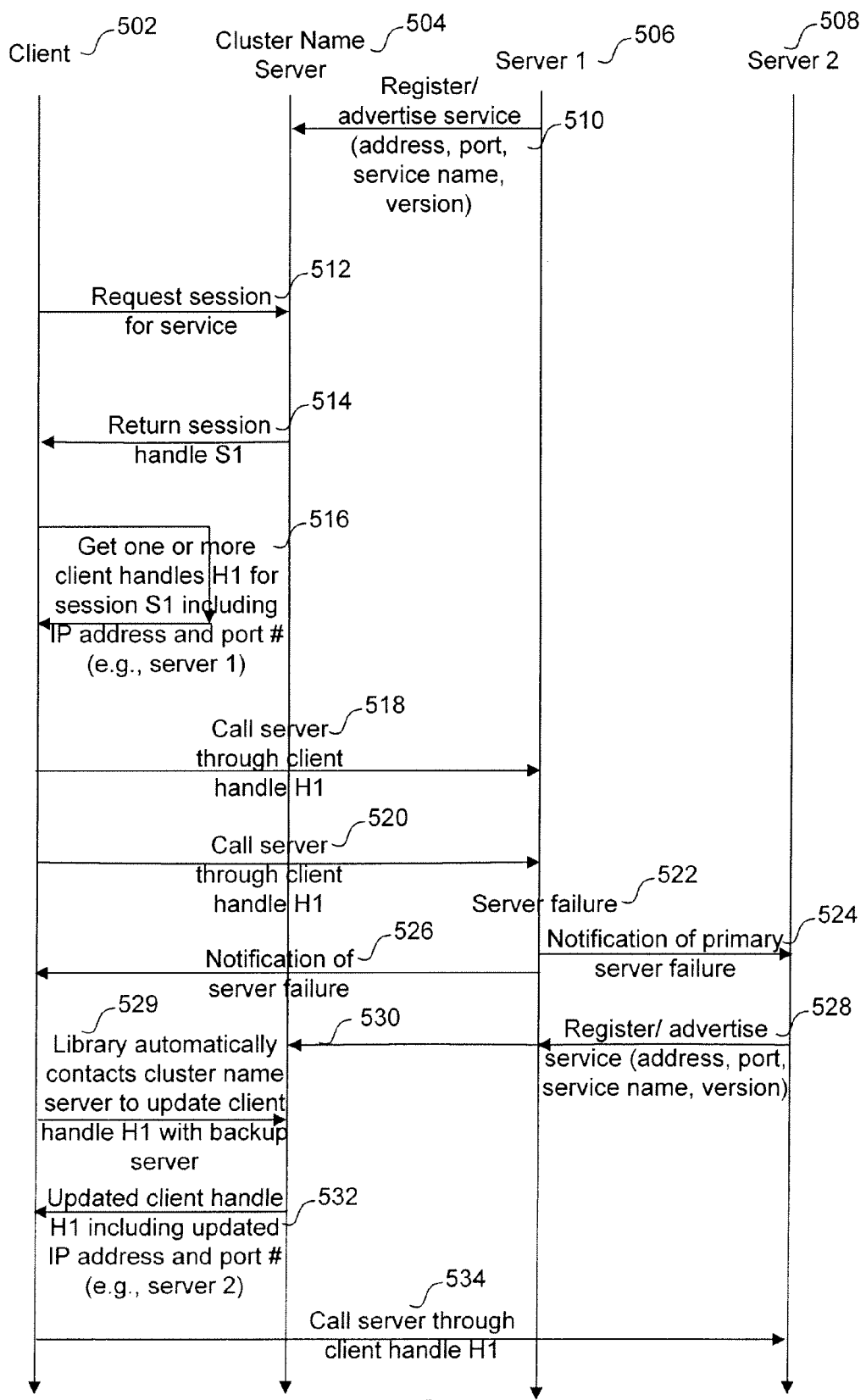
FIG. 4 is a transaction flow diagram illustrating a method of calling a subroutine on a remote server in accordance with various embodiments of the invention.

FIG. 4 is a transaction flow diagram illustrating a method of calling a service (e.g., subroutine) on a remote server in accordance with various embodiments of the invention. Processes performed by the client, Cluster Name Server (CNS), a first server Server 1, and a second server Server 2 are represented by vertical lines 502, 504, 506, and 508, respectively. The CNS maintains a list, directory, or other suitable data structure that maintains connection information for enabling a connection to be established by a client with a server. An exemplary directory will be described in further detail below with reference to FIG. 5. In order to supply this information to the CNS, a server sends a registration message to the CNS. As described above, since each server typically maintains its own broker, the server's broker typically need not maintain its server's address in its connection information. However, in accordance with various embodiments of the invention, since the CNS is a separate entity, the registration message includes both the IP address of the server and a port number to call one or more specified services. In order to identify a particular service, the registration message identifies the service (e.g., via a service name) and may also indicate one or more versions of the service being registered. Thus, server 1 506 sends a registration message or advertisement at 510 to the CNS 504 including its address, port number, service name and version number. The CNS will then store the information provided in the registration message in a directory such as that described below with reference to FIG. 5. For instance, this information may include the server's IP address, port number, service name (e.g., function or procedure name) and/or version(s) of the service. In this manner, the CNS supports automatic service selection via RPC on a remote server. Servers may register upon booting, or upon becoming the "primary" server rather than a backup server.

In order to call a service on a remote server, a client 502 automatically sends a request to the CNS for connection information for a specified service. Specifically, the request identifies the specified service, and may therefore include the service name, as well as identify one or more versions of the specified service. The connection information for the specified service may then be provided transparently to the client. For instance, the connection information may be provided to the client in the form of a handle. Specifically, the connection information may include an IP address and a port number to be used to call the specified service. The client may then call the service through the handle.

In accordance with one embodiment, two different handles are implemented. Specifically, the request for connection information is sent in the form of a request for a session. Thus, as shown at 512, the client sends a request for a session for a specified service. Specifically, the request may identify the specified service via a service name, as well as version number(s) of the specified service. The client then receives a session handle S1 including the connection information, at 514. The client 502 then generates one or more client handles H1 for the session S1 including the connection information (e.g., server IP address and port number) at 516. The client 502 may then call the service through the client handle(s).

In this example, the connection information provided in the session handle S1 includes the IP address of server 1 and a port number associated with the requested service. Thus, as shown at 518, the client 502 calls the service on server 1 via the client handle H1. The client 502 may repeatedly call the service on server 1 via the client handle H1, as shown at 520.

Upon failure, powerdown, or reconfigure of the server at 522, the server 506 may send a notification of the primary server's failure at 524 to one or more redundant servers, shown here as server 2 508. In addition, the server 506 may also notify the client 502 of the server's failure at 526. The backup server 508 then registers its service(s) with the CNS at 528. As described above, the registration message includes both the IP address of the server and a port number to call a specified service. In order to identify a particular service, the registration message identifies the service (e.g., via a service name) and may also indicate one or more versions of the service being registered. Specifically, in accordance with one embodiment, the registration message includes the IP address of the server, port number, service name, and version(s) of the service.

Upon registering the backup server 508, it may be desirable to delete the entry in the directory associated with the failed primary server. Alternatively, it may be desirable to register all servers (e.g., primary and backup servers) upon power-up. Similarly, it may be desirable to enable a server to change its connection information and/or supported services dynamically. For instance, it may be desirable to enable a server to send a "de-registration" message indicating that a particular service is no longer supported at the IP address and specified port, as well as a "registration" message indicating that one or more specified services are supported at the IP address and specified port. These messages, once received by the CNS, may trigger a notification that is sent by the CNS to one or more clients indicating those services that are new or no longer available. For instance, the clients receiving such a notification may be all clients associated with the CNS (e.g., those that have previously requested a particular service from the CNS). Alternatively, a client may poll either the CNS or a particular server to ascertain whether a particular server is providing a particular service. Such a polling message may use a particular handle to identify a particular server (e.g., IP address), port, service and/or one or more versions of the service. This may be desirable, for example, after the client is notified that the handle is non-functional in the event that the server is merely unavailable. Polling may be performed until either the server becomes available or a timeout for its call is exceeded. Alternatively, the client may notify the server that a service is not being delivered, and request notification from the CNS when the service is available. This may be desirable, for example, if a client has been initialized before the service has been configured on a particular server.

Upon receiving a registration message by the CNS, it may be desirable to store entries for each of these registering servers in the directory. Upon failure of one of the servers (e.g., primary or backup), it may be desirable to delete the appropriate entry from the directory. In other words, it may be desirable to delete an entry when notice that the server is non-functional (e.g., for the specified service or version(s)) is received.

A subsequent request for connection information for the specified service is then automatically sent to the CNS by the client when the notice is received at 530. In this example, the server sends a notification of its failure in the form of an error message (e.g., when the service is called). However, a notice indicating that the handle (e.g., client handle) is non-functional may be sent in a variety of forms. In addition, the notice need not be sent by the server. For instance, the notice may also be sent to the client 502 by the CNS 504.

It is important to note that the subsequent request for connection information is automatically sent by the client. In accordance with one embodiment, this is accomplished by a library that automatically contacts the cluster name server to update the client handle H1. As described above, a request may identify the specified service via a service name, as well as version number(s) of the specified service. For instance, the client handle H1 may be updated with connection information associated with a backup server that has replaced the primary server. In this example, the CNS 504 provides the client 502 with updated connection information in the form of an updated client handle H1 including an updated IP address and port number at 532. Alternatively, the CNS 504 may provide the client 502 with an updated session handle. In this example, the updated IP address and port number identify a port on server 2 508. The client (e.g., library) may then automatically call the service provided by server 2 508 through the updated client handle H1 at 534.

The library may include a variety of methods (e.g., functions or procedures), which will enable a service to be called. In addition, the library may be coupled to a standard Remote Procedure Call (RPC) library. In this manner, the services provided by the standard RPC library may be leveraged.

In the above described embodiments, the client handle H1 is updated. In accordance with one embodiment, a session handle represents a single program and version. In order to handle any number of programs and versions, one or more client handles are generated. An exemplary client handle will be described in further detail below In the following description, the session and client handles are described as objects. However, it is important to note that the handles may be implemented in an alternate manner. Therefore, the described embodiments need not be implemented in an object-oriented language.

In accordance with one embodiment, the session handle object identifies the CNS server address, a file descriptor associated with the connection, a program and version. Although the session handle is shown as being implemented as a single object, the session handle may also be implemented as multiple objects.

In accordance with one embodiment, the client handle may include one or more functions for performing operations such as those that handle server failover and client handle calls. In addition to the functions implemented in the client handle or instead of those implemented in the client handle, an embedded handle referencing a standard client handle may be accessed via a standard call. For instance, a function in the client handle may forward its parameters to the corresponding functions implemented in the embedded client. In this manner, the standard RPC library may be leveraged. Although the client handle is shown as being implemented as a single object, the client handle may also be implemented as multiple objects.

In accordance with one embodiment, a client handle is used by the client to identify and manipulate a message channel through a specific end-point. Another handle may similarly be used for the server side. A channel end-point may be represented by an IP address or a "universal address." A universal address is a string that identifies a channel end-point. A universal address for a TCP or UDP endpoint over Ipv4 is a list of addresses where the first four are the IP address and the last two are the port number.

Once services have been called and are no longer needed, the client handle may be deleted. Moreover, when all client handles associated with a particular session handle are no longer needed, the session handle may also be deleted.

FIG. 5 is a diagram illustrating a directory stored on a cluster name server such as that illustrated in FIG. 2 and implemented in FIG. 4 in accordance with one embodiment of the invention. As shown, the IP address of the machine providing the service and a port number are stored in association with a specified service. The service may be identified by name. In addition, one or more versions of the service may also be identified. A remote procedure call (RPC) number may be used to identify the associated remote procedure call (RPC).

In order to simplify the process of locating a server, in accordance with one embodiment, the client may identify a node cluster in its request. Alternatively, the CNS may identify a node cluster associated with the client upon receipt of a request from the client that identifies the client. From the request, the CNS may identify the appropriate node cluster. From the node cluster, the CNS may identify the appropriate server that provides the requested service. This may be desirable, for example, if more than one server runs the requested service. For instance, it may be desirable to allocate a particular server cluster for use by one or more clients in a particular geographical location or zone. As another example, node clusters may be defined based upon access rights or service needs of a particular organization or group of nodes.

Figure 6:
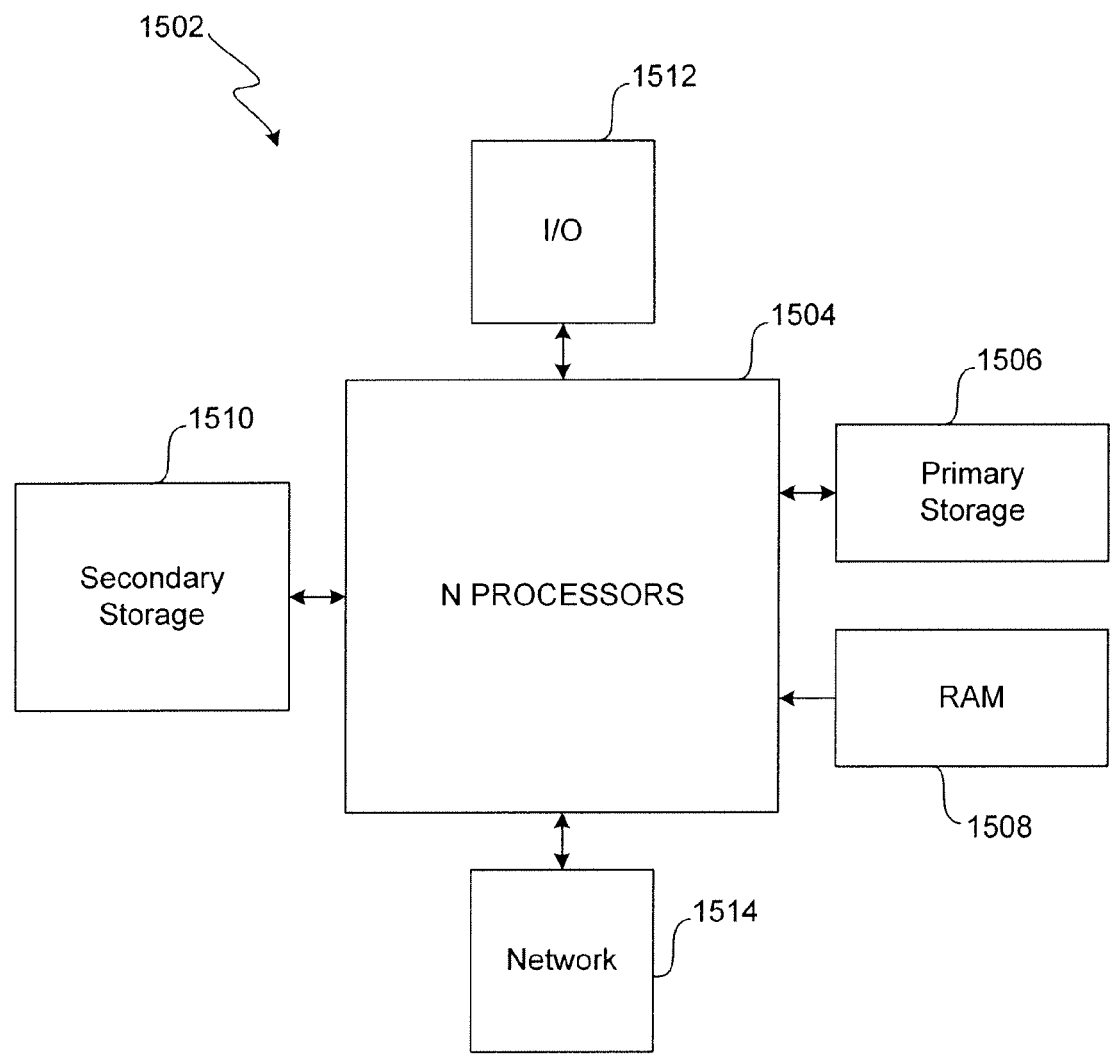
FIG. 6 is a block diagram illustrating a typical, general-purpose computer system suitable for implementing the present invention.

The present invention may be implemented on any suitable computer system. FIG. 6 illustrates a typical, general-purpose computer system 1502 suitable for implementing the present invention. The computer system may take any suitable form.

Computer system 1502 or, more specifically, CPUs 1504, may be arranged to support a virtual machine, as will be appreciated by those skilled in the art. The computer system 1502 includes any number of processors 1504 (also referred to as central processing units, or CPUs) that may be coupled to memory devices including primary storage device 1506 (typically a read only memory, or ROM) and primary storage device 1508 (typically a random access memory, or RAM). As is well known in the art, ROM acts to transfer data and instructions uni-directionally to the CPUs 1504, while RAM is used typically to transfer data and instructions in a bi-directional manner. Both the primary storage devices 1506, 1508 may include any suitable computer-readable media. The CPUs 1504 may generally include any number of processors. One or more servers may be implemented on a single computer system 1530.

A secondary storage medium 1510, which is typically a mass memory device, may also be coupled bi-directionally to CPUs 1504 and provides additional data storage capacity. The mass memory device 1510 is a computer-readable medium that may be used to store programs including computer code, data, and the like. Typically, the mass memory device 1510 is a storage medium such as a hard disk which is generally slower than primary storage devices 1506, 1508.

The CPUs 1504 may also be coupled to one or more input/output devices 1512 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1504 optionally may be coupled to a computer or telecommunications network, e.g., an internet network or an intranet network, using a network connection as shown generally at 1514. Thus, one or more components of the computer system may be located remotely and accessed via a network. With such a network connection, it is contemplated that CPUs 1504 might received information from the network, or might output information to the network in the course of performing the above-described method steps. Such information, which is often represented as a sequence of instructions to be executed using the CPUs 1504, may be received from and outputted to the network.

Figure 7:
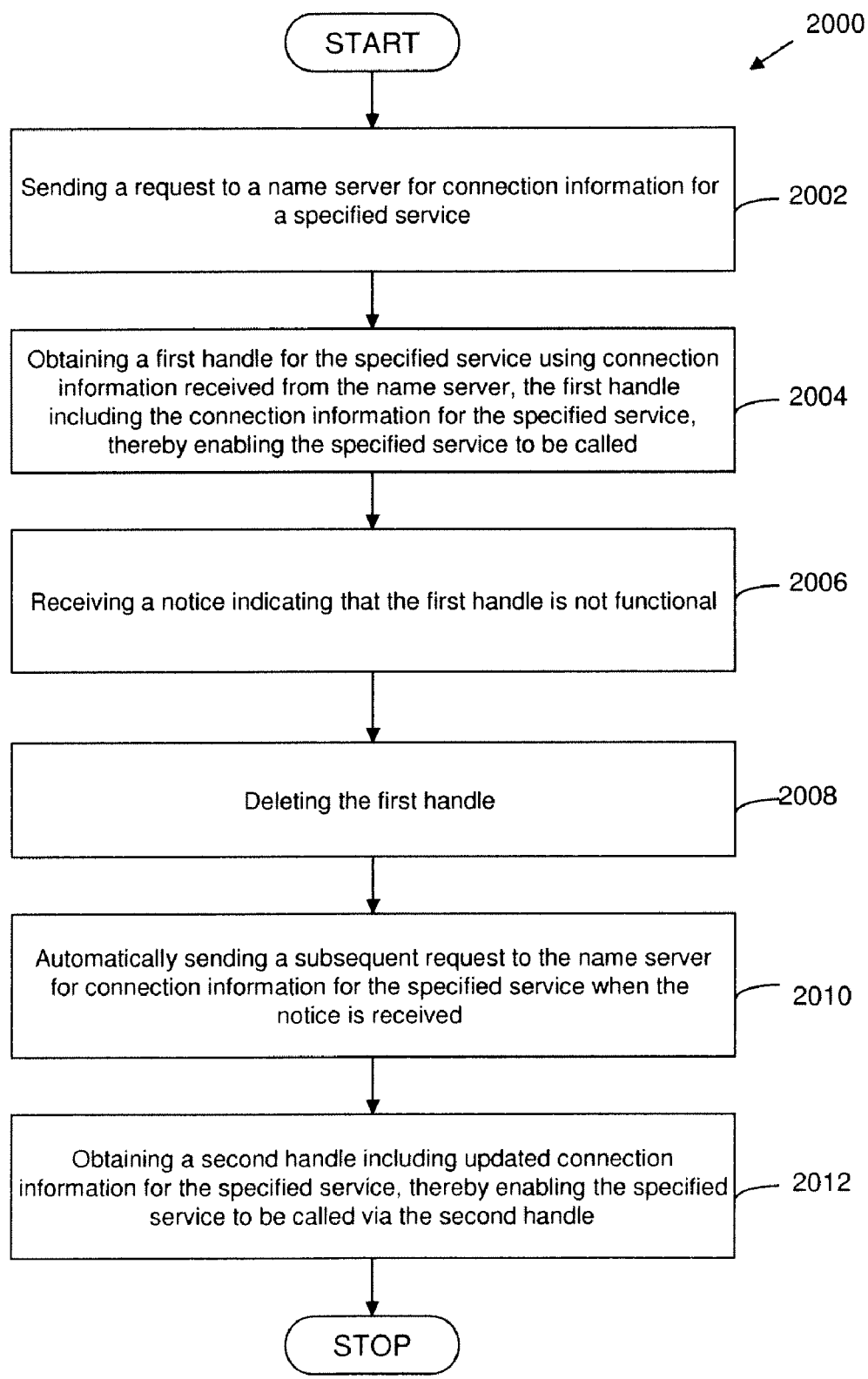
FIG. 7 is a diagram illustrating an automatic service selection in accordance to one embodiment of the present invention.

FIG. 7 is a diagram 2000 illustrating an automatic service selection in accordance to one embodiment of the present invention. In block 2002, the diagram includes sending a request to a name server for connection information for a specified service. In block 2004, the diagram includes obtaining a first handle for the specified service using connection information received from the name server, the first handle including the connection information for the specified service thereby enabling the specified service to be called. In block 2006, the diagram includes receiving a notice indicating that the first handle is not functional. In block 2008, the diagram includes deleting the first handle. In block 2010, the diagram includes automatically sending a subsequent request to the name server for connection information for the specified service when the notice is received. In block 2012, the diagram includes obtaining a second handle including updated connection information for the specified service thereby enabling the specified service to be called via the second handle.

Figure 8:
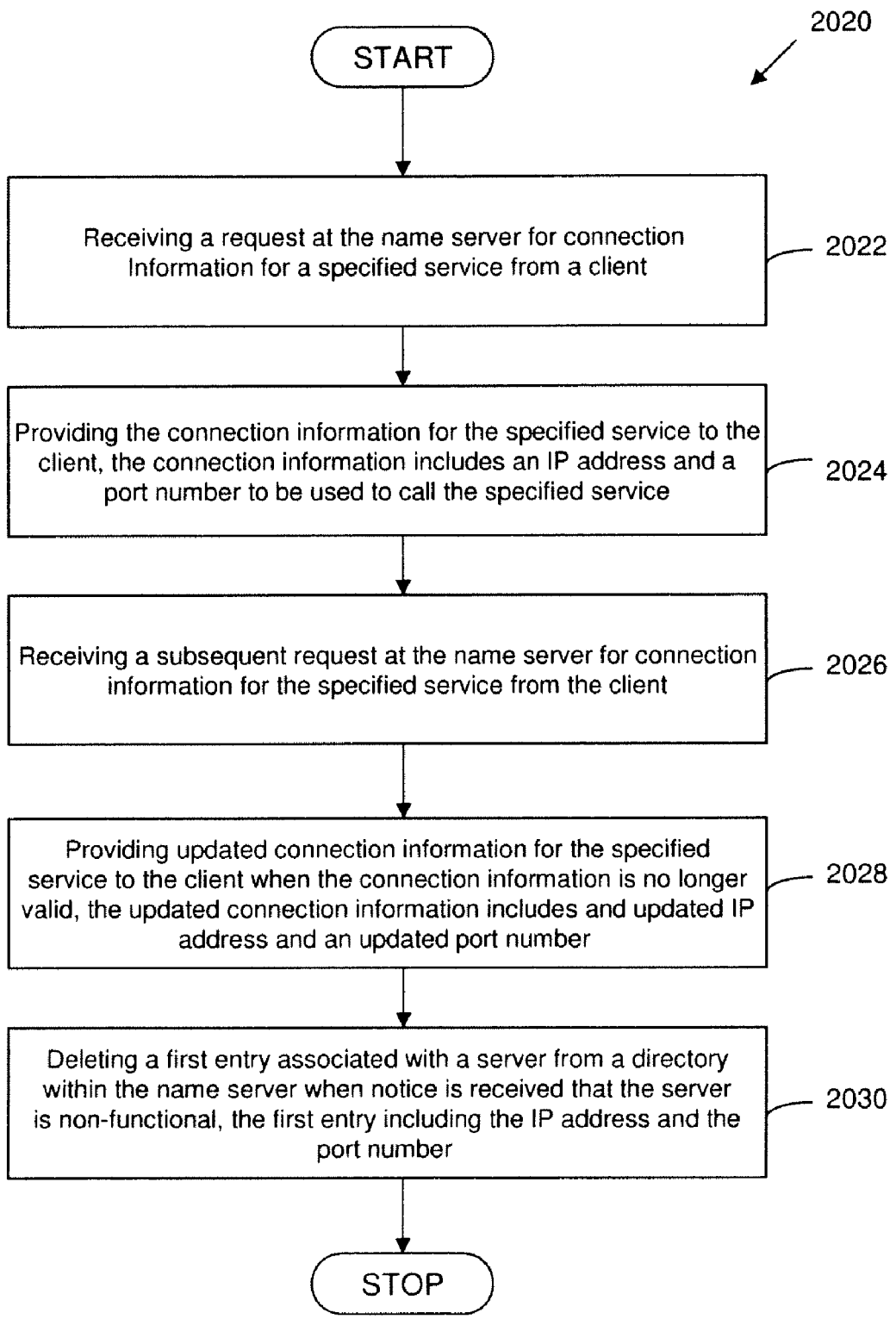
FIG. 8 is a diagram illustrating an automatic service selection in accordance to one embodiment of the present invention.

FIG. 8 is a diagram 2020 illustrating an automatic service selection in accordance to one embodiment of the present invention. In block 2022, the diagram includes receiving a request at the name server for connection information for a specified service from a client. In block 2024, the diagram includes providing the connection information for the specified service to the client, the connection information includes an IP address and a port number to be used to call the specified service. In block 2026, the diagram includes receiving a subsequent request at the name server for connection information for the specified service from the client. In block 2028, the diagram includes providing updated connection information for the specified service to the client when the connection information is no longer valid, the connection information includes and updated IP address and an updated port number. In block 2030, the diagram includes deleting a first entry associated with a server from a directory within the name server when notice is received that the server is non-functional, the first entry including the IP address and the port number.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the above-described embodiments are set forth in relation to the RPC protocol, these embodiments are merely illustrative. Accordingly, the described embodiments may be implemented with respect to a variety of systems and may therefore be implemented with other protocols. Moreover, the above described process blocks are illustrative only. Therefore, the communication among the client, server, and name server may be performed using alternate process blocks as well as alternate data structures. Moreover, although the embodiments are described as being performed with respect to clusters, the described embodiments may be implemented in other manners as well. Thus, while nodes may be configured as members of one or more clusters, cluster configurations are not required in order to support communication among various nodes and a name server. Thus, a name server may be used to support any number of servers or nodes. Accordingly, the present embodiments are to be considered as illustrative and not restrictive, and the invention is not to be limited to the details given herein, but may be modified within the scope and equivalents of the appended claims.

What is claimed is:

1. A method of supporting automatic service selection in a name server, wherein connection information associated with a selected service is provided for calling the selected service on a remote server, comprising:

receiving a first registration message at the name server from a first server, wherein the first registration message includes an IP address and a port number to call a specified service;

storing the IP address and the port number in association with the specified service in a directory;

receiving a request at the name server for connection information for the specified service from a client;

providing the connection information for the specified service to the client, wherein the connection information includes the IP address and the port number to be used to call the specified service;

receiving a second registration message at the name server from a second server, wherein the second registration message includes an updated IP address and an updated port number to call the specified service when the specified service is no longer supported by the first server at the IP address and the port number;

receiving a subsequent request at the name server for updated connection information for the specified service from the client;

providing the updated connection information for the specified service to the client when the connection information is no longer valid, wherein the updated connection information includes the updated IP address and the updated port number to be used to call the specified service; and deleting a first entry associated with the first server from the directory within the name server when notice is received that the first server is non-functional, the first entry including the IP address and the port number.

2. The method as recited in claim 1, further comprising:
sending a notification to the client when the specified service is available.

3. The method as recited in claim 2, wherein sending a notification is performed in response to a request for notification when the specified service is available.

4. The method as recited in claim 1, wherein the name server supports automatic service selection via RPC on a remote server.

5. The method as recited in claim 1, providing the connection information comprises:
   transmitting a session handle including the IP address and the port number.

6. The method as recited in claim 1, wherein providing updated connection information comprises:
   transmitting a client handle including the updated connection information.

7. The method as recited in claim 1, wherein the first registration message further identifies the specified service and one or more versions of the specified service.

8. The method as recited in claim 1, wherein the second registration message further identifies the specified service and one or more versions of the specified service.

9. The method as recited in claim 8, further comprising:
   storing the updated IP address, the updated port number, the specified service, and the one or more versions of the specified service received from the second server in a second entry in the directory.

10. The method as recited in claim 9, wherein deleting the first entry in the directory is performed when the second registration message is received.

11. The method as recited in claim 1, wherein receiving the second registration message is performed after the first server becomes non-functional for the specified service.

12. The method as recited in claim 1, wherein the request further identifies one or more versions of the specified service.

13. An apparatus for supporting automatic service selection in a name server, wherein connection information associated with a selected service is provided for calling the selected service on a remote server, comprising:
   means for receiving a first registration message at the name server from a first server, wherein the first registration message includes an IP address and a port number to call a specified service;
   means for storing the IP address and the port number in association with the specified service in a directory;
   means for receiving a request at the name server for connection information for the specified service from a client;
   means for providing the connection information for the specified service to the client, wherein the connection information includes the IP address and the port number to be used to call the specified service;
   means for receiving a second registration message at the name server from a second server, wherein the second registration message includes an updated IP address and an updated port number to call the specified service when the specified service is no longer supported by the first server at the IP address and the port number;
   means for receiving a subsequent request at the name server for updated connection information for the specified service from the client;
   means for providing the updated connection information for the specified service to the client when the connection information is no longer valid, wherein the updated connection information includes the updated IP address and the updated port number to be used to call the specified service; and
   means for deleting a first entry associated with the first server from the directory within the name server when notice is received that the first server is non-functional, the first entry including the IP address and the port number.

14. An apparatus for supporting automatic service selection in a name server, wherein connection information associated with a selected service is provided for calling the selected service on a remote server, comprising:
   a processor; and
   a memory, at least one of the processor and the memory being adapted for:
   receiving a first registration message at the name server from a first server, wherein the first registration message includes an IP address and a port number to call a specified service;
   storing the IP address and the port number in association with the specified service in a directory;
   receiving a request at the name server for connection information for the specified service from a client;
   providing the connection information for the specified service to the client, wherein the connection information includes the IP address and the port number to be used to call the specified service;
   receiving a second registration message at the name server from a second server, wherein the second registration message includes an updated IP address and an updated port number to call the specified service when the specified service is no longer supported by the first server at the IP address and the port number;
   receiving a subsequent request at the name server for updated connection information for the specified service from the client;
   providing the updated connection information for the specified service to the client when the connection information is no longer valid, wherein the updated connection information includes the updated IP address and the updated port number to be used to call the specified service; and
   deleting a first entry associated with the first server from the directory within the name server when notice is received that the first server is non-functional, the first entry including the IP address and the port number.

15. A non-transitory computer-readable medium storing thereon computer-readable instructions that when executed on a processor in a computerized device, supports automatic service selection in a name server, wherein connection information associated with a selected service is provided for calling the selected service on a remote server, comprising:
   instructions for receiving a first registration message at the name server from a first server, wherein the first registration message includes an IP address and a port number to call a specified service;
   instructions for storing the IP address and the port number in association with the specified service in a directory;
   instructions for receiving a request at the name server for connection information for the specified service from a client;
   instructions for providing the connection information for the specified service to the client, wherein the connection information includes the IP address and the port number to be used to call the specified service;
   instructions for receiving a second registration message at the name server from a second server, wherein the second registration message includes an updated IP address and an updated port number to call the specified service when the specified service is no longer supported by the first server at the IP address and the port number;
   instructions for receiving a subsequent request at the name server for updated connection information for the specified service from the client;
   instructions for providing the updated connection information for the specified service to the client when the connection information is no longer valid, wherein the updated connection information includes the updated IP address and the updated port number to be used to call the specified service; and instructions for deleting the first entry associated with the server from a directory within the name server when notice is received that the first server is non-functional, the first entry including the IP address and the port number.

* * * * *